Patented Nov. 1, 1932

1,886,045

UNITED STATES PATENT OFFICE

GUSTAVE T. REICH, OF ANAHEIM, CALIFORNIA

UTILIZATION OF WASTE ORGANIC MIXTURES

No Drawing.   Application filed April 1, 1927.   Serial No. 180,341.

This invention relates to a process for freeing waste organic mixtures and especially residues from fermentation liquids or from sugar refineries from chlorine and reducing their potassium content and converting the chlorine into hydrochloric acid.

An object of my invention is to provide a process by which all KCl is converted into $K_2SO_4$. Another object is to provide a process in which the potassium content can be reduced. Another object is the raising of the nitrogen content considerably. Another object is to liberate hydrochloric acid with another mineral acid without destroying the nitrogen content.

The fermentation liquid resulting from the fermentation of cane or beet molasses may contain approximately 10% alcohol and approximately 10% of various organic substances depending on the original material. In my Patents No. 1,552,732 and No. 1,599,185 I have described a treatment of such fermentation liquids resulting in the recovery of the alcohol and of a concentrated solution of the other organic substances and in the liberation of hydrochloric acid by means of another mineral acid. These patents further describe a treatment of this solution comprising neutralization, retorting and removing organic acids, resulting in an ultimate product containing about 3.5% $N_2$ and 12-16% potassium (calculated as $K_2O$) in the form of KCl or $K_2SO_4$. This product represents a valuable fertilizer.

My invention is capable of being carried out in many different ways of which the following procedure is an illustration.

Principally my process consists of a double decomposition between the KCl and an inorganic salt added to the solution and so selected as to react with the KCl with formation of at least one less soluble salt. The bulk of the inorganic salts may be precipitated by concentration of the solution. The supernatant solution containing the organic and the remainder of the inorganic substances may be separated from the precipitate. By availing myself of the difference in the solubility of the salts composing the precipitate in different solvents, I am able to separate them from each other and to recover them in a highly pure state. It is an essential feature of this invention to select the inorganic salt to be added expediently so as to produce a precipitate composed of salts of distinctly different solubility in different solvents and of considerably different solubility from each other.

To illustrate the practical operation of my process I shall describe the procedure when $(NH_4)_2SO_4$ is selected as the salt to be added.

The solution of organic residues remaining after the distillation of the alcohol may be neutralized according to my Patent No. 1,599,185, and need be neither retorted nor freed from the organic acids.

First, the solution is concentrated to such a gravity that when $(NH_4)_2SO_4$ is added $K_2SO_4$ will be partly precipitated. If the solution be properly concentrated prior to the addition of $(NH_4)_2SO_4$, I will now be able, by the mere addition of an amount of $(NH_4)_2SO_4$ preferably somewhat exceeding the stoichiometrically required quantity, to precipitate 30-35% of the $K_2SO_4$ formed in pure state. Having separated the solution and precipitate by conventional means I further concentrate the solution until a specific gravity of approximately 1.25-1.35 is attained. When this concentration is reached the solution may be cooled whereby practically all the inorganic salts will be precipitated. The bulk of the small portion remaining in solution will be $(NH_4)_2SO_4$, it being the most soluble of the four possible salts in question. The mother liquor is separated from the precipitate by conventional means and is further treated according to my cited patents. The precipitate consisting of $K_2SO_4$ and $NH_4Cl$ may be leached with a solvent, preferably alcohol of approximately .92-.94 specific gravity, whereby $NH_4Cl$ is dissolved completely whereas the bulk of $K_2SO_4$ remains undissolved. I separate the solution and the residue by conventional means and proceed to distill the solution, first driving off and recovering the solvent and then concentrating the aqueous solution until approximately $\frac{1}{10}$ of its content of ammonium salt is precipitated. I separate the solution from the precipitate returning the former to another portion of fermentation residue to be treated thus avoiding any loss. The precipitate consists of very pure $(NH_4)Cl$.

As the result of the whole operation, I therefore obtain a fertilizer of 6-8% nitrogen, 10-14% potassium (calculated as $K_2O$) as sulfate free of chlorine. Besides I obtain $K_2SO_4$ and recover the applied ammonium in the form of $NH_4Cl$ both inorganic salts being of high purity and greater value.

While I have described in the foregoing my invention by way of example, I wish it to be understood that I do not mean to restrict the scope of my invention to the specified conditions. The invention comprises many modifications, as for instance, application of the process after retorting the original residues or before their neutralization or substitution of other suitable ammonium salts for $(NH_4)_2SO_4$, or application of the process to other waste organic mixtures, or by treating the double decomposition product before or after retorting with a mineral acid, capable of liberating hydrochloric acid, or treating the retorted product with an ammonium salt and afterwards with the mineral acid.

I claim:

1. Process for separating alkali metal compounds from organic matter in waste organic mixtures containing alkali metal chlorides, such as fermentation residues, which comprises adding ammonium sulfate to an aqueous solution of such residues, concentrating the solution until it has a specific gravity of 1.25-1.35 whereby alkali metal sulfate and ammonium chloride are precipitated, separating the precipitate from the solution, and separating the alkali metal sulfate from the ammonium chloride by selective dissolution in ethyl alcohol.

2. Process for separating potassium compounds from organic matter in waste organic mixtures containing potassium chloride, such as fermentation residues, which comprises adding ammonium sulfate to an aqueous solution of such residues, concentrating the solution until it has a specific gravity of 1.25-1.35 whereby potassium sulfate and ammonium chloride are precipitated, separating the precipitate from the solution and separating the potassium sulfate from the ammonium chloride by selective dissolution in ethyl alcohol.

3. Process for separating potassium compounds from organic matter in waste organic mixtures containing potassium chloride and sulfate, such as fermentation residues, which comprises adding ammonium sulfate to an aqueous solution of such residues, concentrating the solution until it has a specific gravity of 1.25-1.35 whereby potassium sulfate and ammonium chloride are precipitated, separating the precipitate from the solution and separating the potassium sulfate from the ammonium chloride by selective dissolution in ethyl alcohol.

In testimony whereof, I affix my signature.

GUSTAVE T. REICH.